(12) United States Patent
Løken

(10) Patent No.: US 10,089,600 B2
(45) Date of Patent: *Oct. 2, 2018

(54) METHOD FOR MANUFACTURING A GROUP OF PACKAGING MEDIA

(71) Applicant: KEZZLER AS, Oslo (NO)

(72) Inventor: Magnar Løken, Oslo (NO)

(73) Assignee: KEZZLER AS, Oslo (NO)

( * ) Notice: Subject to any disclaimer, the term of this patent is extended or adjusted under 35 U.S.C. 154(b) by 0 days.

This patent is subject to a terminal disclaimer.

(21) Appl. No.: 15/477,843

(22) Filed: Apr. 3, 2017

(65) Prior Publication Data

US 2017/0206494 A1    Jul. 20, 2017

Related U.S. Application Data

(63) Continuation of application No. 14/775,051, filed as application No. PCT/NO2014/050041 on Mar. 19, 2014, now Pat. No. 9,646,285.

(30) Foreign Application Priority Data

Mar. 21, 2013 (NO) .................................. 20130416

(51) Int. Cl.
| | |
|---|---|
| *G06F 17/00* | (2006.01) |
| *G06Q 10/08* | (2012.01) |
| *G06Q 30/00* | (2012.01) |
| *G07D 7/00* | (2016.01) |
| *G06F 17/30* | (2006.01) |

(Continued)

(52) U.S. Cl.
CPC ..... *G06Q 10/087* (2013.01); *G06F 17/30516* (2013.01); *G06K 17/00* (2013.01);
(Continued)

(58) Field of Classification Search
CPC .......... G09F 23/00; G09F 3/0288; G09F 3/10; G06F 17/30516; G06F 17/30545;
(Continued)

(56) References Cited

U.S. PATENT DOCUMENTS

| | | |
|---|---|---|
| 4,397,532 A | 8/1983 | Webb |
| 5,671,008 A | 9/1997 | Linn |

(Continued)

FOREIGN PATENT DOCUMENTS

| | | |
|---|---|---|
| DE | 10 2007 061 825 A1 | 6/2008 |
| EP | 2 306 377 A1 | 4/2011 |
| WO | WO 2010/140892 A1 | 12/2010 |

*Primary Examiner* — Thien M Le
(74) *Attorney, Agent, or Firm* — Birch, Stewart, Kolasch & Birch, LLP

(57) ABSTRACT

A method for manufacturing a group of packaging media includes producing a series of packaging media; generating a sequence of unique codes in a computer system, physically marking the series of packaging media with the unique codes; registering a first unique code marked on a first packaging media in a first end of the series, entering an ordered number of packaging media in the computer system, creating two or more sub-series of packaging media from the series of packaging media based on the ordered number, registering a last unique code marked on a last packaging media in a last end of the sub-series, calculating an expected number of packaging media in the sub-series, and accepting the sub-series if a difference between the expected number and the ordered number is within a pre-defined tolerance, or refusing the sub-series if the difference is outside the pre-defined tolerance.

18 Claims, 1 Drawing Sheet

(51) Int. Cl.
*G06Q 50/04* (2012.01)
*G06K 17/00* (2006.01)

(52) U.S. Cl.
CPC ............ *G06Q 30/00* (2013.01); *G06Q 50/04* (2013.01); *G07D 7/0032* (2017.05)

(58) Field of Classification Search
CPC ......... G06F 17/30864; G06F 17/30879; G06F 17/3089; G06F 17/30899; G06F 7/58; G06F 7/582; G06Q 10/083; G06Q 10/087; G06Q 30/00
USPC ........................................................ 235/375
See application file for complete search history.

(56) References Cited

U.S. PATENT DOCUMENTS

| | | | |
|---|---|---|---|
| 6,155,025 A * | 12/2000 | Komiya | B65B 5/10 53/147 |
| 8,286,869 B1 | 10/2012 | Grant | |
| 9,646,285 B2 * | 5/2017 | Loken | G06Q 10/087 |
| 2002/0149793 A1 * | 10/2002 | Hepworth | G06K 17/00 358/1.18 |
| 2002/0150311 A1 * | 10/2002 | Lynn | G06F 17/30011 382/306 |
| 2004/0108386 A1 | 6/2004 | Rasti | |
| 2006/0136570 A1 * | 6/2006 | Pandya | G06F 17/30985 709/217 |
| 2009/0287533 A1 * | 11/2009 | Swamynathan | G06F 17/30528 705/7.31 |
| 2011/0049862 A1 | 3/2011 | Hill | |
| 2011/0270681 A1 * | 11/2011 | Outten | G06Q 30/00 705/14.58 |
| 2012/0176649 A1 * | 7/2012 | Giordano | G06Q 30/00 358/1.18 |
| 2013/0221085 A1 | 8/2013 | Normile | |
| 2013/0346156 A1 | 12/2013 | Ho | |
| 2014/0104626 A1 | 4/2014 | Giordano et al. | |
| 2015/0134797 A1 | 5/2015 | Theimer et al. | |
| 2015/0278309 A1 | 10/2015 | Harada et al. | |

* cited by examiner

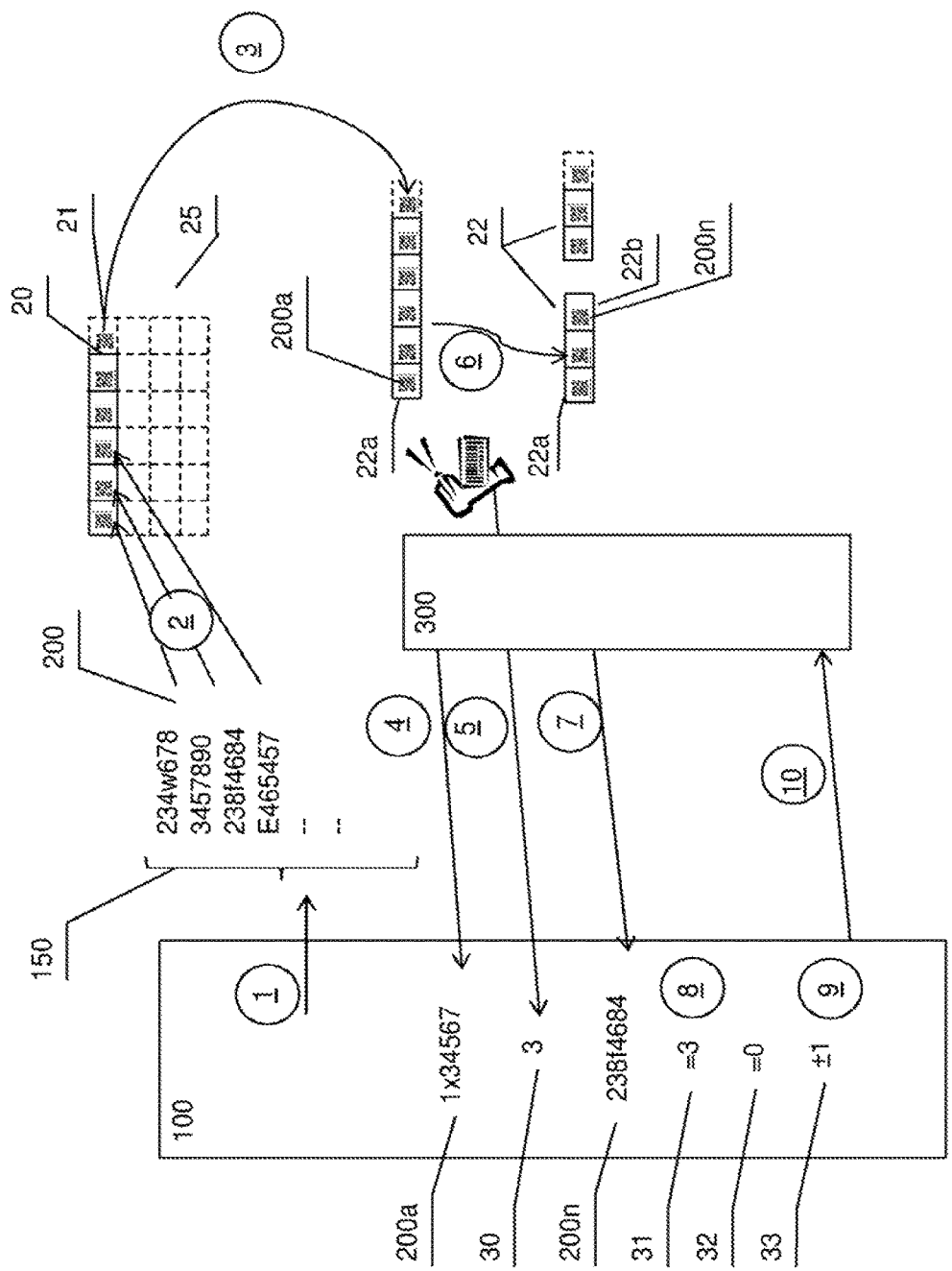

METHOD FOR MANUFACTURING A GROUP OF PACKAGING MEDIA

CROSS-REFERENCE TO RELATED APPLICATIONS

This application is a Continuation of U.S. patent application Ser. No. 14/775,051 filed on Sep. 11, 2015, which was filed as the National Phase of PCT International Application No. PCT/NO2014/050041 filed on Mar. 19, 2014, which claims priority to Norwegian Patent Application No. 20130416 filed on Mar. 21, 2013, all of which are expressly incorporated by reference into the present application.

TECHNICAL FIELD OF THE INVENTION

The invention relates to marking of items with unique codes for the purpose of tracking and tracing the items in the supply chain. More specifically the invention relates to the control and manufacture of pre-coded packaging material, such as labels, cartons, RFID-chips, wrapping cartons on rolls etc.

BACKGROUND ART

Track and Trace systems for tracking and tracing of manufactured items is well known in the industry. Counterfeiting affects both the manufacturer and the public. E.g. in the field of pharmaceuticals, fake medicines may have no effect, or they can have dangerous side effects.

The systems used for preventing counterfeiting are implemented in a number of different ways.

One group of technology in the field is concerned with how to mark items and how to read back the information from the items to avoid copying of products. To avoid copying, the items can be marked with invisible markers, encrypted codes, RFID tags etc. It should be difficult for a counterfeiter to discover and decipher the information marked on the item, since this would enable the counterfeiter to copy the items and the marking in a way that would lead a consumer to believe they buy the original product.

Another group of technology is more concerned with how to authenticate, follow, or trace an item from the manufacture to the end customer. By marking every single product with a unique code or digital identifier, any product can be checked instantaneously on an individual basis by anyone at any location.

By controlling the supply chain, and especially what happens to the items when being received and shipped in the distribution points, the possibility of successful counterfeiting or other fraudulent activities is reduced. This is commonly referred to as secure track and trace.

A secure track and trace system is surveying and managing all goods having been marked and registered with a unique identifier, and at the same time controlling all parties allowed to handle the products, all the way from the manufacture to the end consumer.

Track and trace systems according to background art works in the way that product items and associated transportation units are marked with a unique identifier. This identifier is then utilized to continuously authenticate the product in the supply chain. If the authentication process has a positive outcome, i.e. the product and code has been determined to be genuine, additional information related to the product and the present stage of the supply chain may be recorded and stored for later retrieval and analysis. The pivotal information that is recorded during the addition of a new tracking record is the identity of the product or transportation unit, the location and the time and also information about the operator. If available, the devices and method by which the product was authenticated, as well as other circumstantial and pertinent information may also be recorded in the tracking record.

This series of tracking records recorded by the track and trace system will result in a complete history of the handling of the product in the supply chain, that might be presented and audited at any time for security or other purposes.

According to prior art the unique codes may be generated and printed directly on the item during the manufacturing or packaging process. However, in many instances and for some industrial applications it is impractical to mark the products as they are manufactured or packed. For instance this is the case if generic and "white" products are manufactured at a central facility and later exported to different markets where the products must be amended to fulfill different local requirements and regulations and, as a consequence, associated with market specific information.

As an alternative marking method, the codes are generated before the products are packaged or even before they are manufactured. In fact it is not even necessary to know which products the codes are to be marked on when generating the codes since the codes can be associated with the products at a later stage when the exact association is known. This link between the code and the product may be established before, during or after manufacturing or packaging or at any later stage in the supply chain.

Pre-printed media to be used in the packaging or manufacturing process may come in a variety of formats, depending on the actual requirements of the manufacturing and packaging process.

Pre-printed media are often delivered as labels, cartons, etc. on rolls. Typically a roll of pre-printed media will be delivered for the manufacture or packaging of a specific batch, where the packaging media format and the number of packaging media on the roll is adapted to the batch. One example of such pre-printed media is pre-printed unfolded cartons delivered on a roll of paper or cardboard, for example 1000 pre-printed medicine cartons on a roll, each with a unique code. The roll may then be cut into into individual carton units and folded as part of the manufacturing or packaging process.

Another example is a container, or box of 1000 pre-printed cartons, each with a unique code that are already cut and put into the box before they reach the manufacturing or packaging process. They may also be partly folded inside the box. Here, the collection of the pre-printed media is not necessary in the same order as the generated codes in the computer system, and also are not physically attached or linked to each other as would be on a roll.

In any case, rolls, boxes and any other format where a specific number of pre-printed packaging media is delivered as a unit to a manufacturing process is in the following defined as a group of packaging media.

The manufacture of labels on rolls will in the following be used to describe prior art related to pre-printed media. However, other pre-printed media as discussed above will be equally relevant for the purpose of this invention. It is important to understand that pre-printed media is often manufactured in several steps, usually from a large paper roll, that is printed, sliced and cut in one or more operations.

The technical characteristic of preprinted media is that they are initially manufactured as a continuous strips or lanes of individual items, such as labels or unfolded cartons. It is also common to arrange the strip such that the strip across its width has several units adjacent to each other. For instance a continuous label strip can have four instances across the width of the strip. The strips are then cut in suitable lengths, such as a given length or number of individual units. In the case of more labels in the width of the strip these are separated and divided, typically by some form of cutting process. In this case the one original strip with four labels across the strip width has been transformed to four strips or lanes with one label across each strip. Each new strip would then normally be ¼ the width of the original strip.

The strips are then cut into suitable lengths and and winded to a roll or coil or a coherent bundle. These rolls and bundles are then shipped to various locations where they will used for production and packaging of products.

The result is that a roll, bundle or coil has a specific, controlled and verified number of units.

The pre-printed packaging material on these rolls are marked with individual, or unique codes that need to be managed and controlled during the production of the pre-printed packaging material and later when they are applied during the manufacturing process.

In order to make this process more efficient, the marked unique codes on the rolls are delivered and made with codes according to a coding system that are arranged in a logical sequence. For instance a roll or bundle can contain 5000 labels with numbers that logically ranges from 12001 to 17000. This means that the first label is numbered 120001 and the last label is numbered 17000. The number range means that the computer system being the source can calculate all the labels on the roll having recorded the first and last label.

The marking of the labels or packaging material with the individual codes means that during the manufacturing of the rolls, the number of unique codes should be recorded for each roll to be made. There is no margin for errors in the code recording process since all errors will propagate to the code tracking system and essentially made all the products marked with incorrect information.

Normally during manufacture of the strips and the resulting packaging there is no determination of which labels will be the first and the last. Even the lanes from a wider original strip might be winding in a random direction for all lanes when being slit into multiple lanes. Further, another common problem is that some parts of the strip may be damaged. Sometimes this is repared by <<stitching>> the strips together. For pre-printed packaging material with unique codes, this type of stitching of broken strips is strictly forbidden.

It is as also not generally possible to know in advance in which direction the rolls are being winded relative to the original printing and strip making direction. When winding the roll, the <<first>> and <<last>> label can e.g. either be 12001 (first) and 17000 (last), or equally possible label with code 17000 (first) and 12001 (last).

After the pre-printed media have been manufactured and sent to the packaging process, it is important that the pre-printed media has the expected, or ordered characteristics that can be used for the specific packaging process and batch.

Pre-printed packaging media should normally only be applied to a specific and controlled packaging process. E.g. a roll of 2000 pre-printed unfolded milk cartons should be applied only for a pre-defined specific filling and sealing batch. As described previously, during manufacturing and distribution of the packaging media, there are several possibilities for errors that may not be discovered before it is too late. This may result in production stops, cancellation of entire product batches etc.

If the manufacture of the pre-marked media is not done correctly an unknown quantity of manufactured products will have incorrect information associated and mapped to them in the code computer system where information about the codes on the pre-printed media is stored.

One of the major problems with the present technology is that there is little or no verification of the pre-printed media before applied in the packaging process.

SHORT SUMMARY

Rolls and containers of groups of pre-printed media input to the manufacturing and packaging process have been described above.

It is an object of the invention to disclose a method for manufacturing such groups of pre-printed packaging media that solves the problems present in the industry that have been described above.

It is therefore also an object of the invention to disclose a method that allows easy verification of verify the correctness of the manufactured packaging media applied in a packaging process, and pertinent data concerned such as the number of units, their internal relations, etc, have been controlled and verified before the packaging process starts.

Further consequently this controlled and verified data of the grouped pre-printed media can be used for correctly controlling the information that is or will be associated with the products.

The invention is in an embodiment a method for manufacturing a group of packaging media comprising the steps of;

generating a sequence of unique codes in a computer system a series of packaging media with said unique codes is maintained in said series of packaging media from said series by;

registering in said computer system marked on a first packaging media in a first end of said series an ordered number of packaging media in said computer system said sub-series based on said ordered number in said computer system marked on a last packaging media in a last end of said series in said computer system an expected number of packaging media in said sub-series based on a difference between said first unique code and said last unique code in said sequence of unique codes, accepting said sub-series of packaging media if a difference between said expected number and said ordered number is within a pre-defined tolerance, or refusing said sub-series of continuous packaging media if said difference between said expected number and said ordered number is outside said pre-defined tolerance.

According to the current invention the start and end pre-printed media are strictly managed and controlled. Further, all the pre-printed media between the start and end are controlled and managed as a coherent, recognizable and inseparable group.

This inseparable group of pre-printed media may be arranged in any way, such as e.g. a "continuous" roll of pre-printed media, or a container of separated pre-printed media managed as a group by the container.

In relation and within the scope of the present invention, they are considered and treated in the same way as a "continuous" roll since they can be arranged or reconstructed to be a continuous "roll". This means that it is both practical and possible to associate all the pre-printed media within this container with the same information for the total and complete group of marked items.

The present invention makes various uses and applications possible by creating a managed and controlled group of codes whereby interrogating any code within this group with the computer system as the source, will hence provide all aspects, characteristics and properties of all the codes and their relations to each other for that group implicitly without the need to recognize the other codes explicitly in the group as such. Based on this type of query and the returned data by the computer system in response, therefore such activities and tasks as linking information to all the codes or parts of the group, numerous counting based uses and applications, check and balances, etc. will be possible based on the information provided by the computer system about the group based on that query as explained above.

According to the invention means has been provided for verification of the identity of the roll, determination of the winding direction of the pre-printed media, and the possibility for discovering discontinuities of unique codes marked on the packaging media.

FIGURE CAPTIONS

FIG. 1 is a combined block and process diagram for an embodiment of the invention.

EMBODIMENTS OF THE INVENTION

Embodiments of the invention will now be disclosed in more detail with reference to the accompanying drawings.

FIG. 1 is a combined block and process diagram, where the reference numbers for the methodical steps have been circled. The block on the left side of the FIGURE is a computer system (100) handling the generation (100) of unique codes (200) that in turn are marked (2) on the pre-printed media (20).

For the purpose of the invention, the format of the unique codes (200) is not essential. As long as the codes are unique and can be represented as a mark on a physical packaging media (20) they can in principle be used. When the unique codes (200) are generated they should have a sequential order (150) that can later be used as an input to the verification process of the manufactured packaging media (20).

The physical marking (2) of the unique codes (200) can also be in any format, such as bar codes, RFID tags etc. Thus, it will be understood that the marking (2) step may involve coding of the generated unique codes (200) to a format suitable for marking on packaging media (200).

After marking (2) the resulting series (21) of packaging media (20) are usually quite long, and the series (21) have to be cut into sub-series (22) according to the number of marked packages that should be the output of a specific batch of a manufacturing process of where the continuous pre-printed media (20) is used, e.g. the first hundred continuous packaging media (20) of the series should be used in for medicine 1 and the next 350 continuous packaging media (20) should be used for medicine 2, etc.

According to the invention, when the sub-series (22) are created from the series (21), some information is registered and sent back to the computer system (100). This makes it possible for the computer system to verify that the resulting sub-series (22) are marked with an expected range of unique codes (200).

In an embodiment the invention is method for manufacturing a group of packaging media (20) comprising the steps of;

generating (1) a sequence (150) of unique codes (200) in a computer system (100), marking (2) a series (21) of packaging media (20) with said unique codes (200), wherein said sequence (150) is maintained in said series (21), creating two or more sub-series (22) of packaging media (2) from said series (21) by;

registering (4) in said computer system (100), a first unique code (200a) marked on a first packaging media (20) in a first end (22a) of said series (21), entering (5) an ordered number (30) of packaging media (20) in said computer system (100), creating (6) said sub-series (22) based on said ordered number (30), registering (7) in said computer system (100), a last unique code (200n) marked on a last packaging media (20) in a last end (22b) of said series (21), opposite said first end 22(a), calculating (8) in said computer system (100) an expected number (31) of packaging media (20) in said sub-series (22) based on a difference between said first unique code (200a) and said last unique code (200n) in said sequence (150) of unique codes (200), accepting (9) said sub-series (22) of packaging media (20) if a difference (32) between said expected number (31) and said ordered number (30) is within a pre-defined tolerance (33), or refusing (9) said sub-series (22) of continuous packaging media (20) if said difference (32) between said expected number (31) and said ordered number (30) is outside said pre-defined tolerance (33).

The initial steps for this embodiment, i.e. generating (1) unique codes (200) and marking (2) the packaging media (20) have already been explained above.

In the following it will be explained in more detail how the sub series are created (3).

A first unique code (200a) is registered in the computer system (100). This can in one embodiment be done by a cutting operator that is scanning the first unique code (200a) that appears in a first end (22a) of the sub-series (22). The first end of the sub-series (22) is also the first end of the remaining part of the series (21). In FIG. 1, a scanner can be seen connected to a cutter computer (300) in communication with the computer system (100). The cutter computer may in one embodiment be part of a larger cutter machine, but this is not important for the invention. What is essential is that the first unique code (200a) can be read and sent to the computer system (100).

Usually an order for a sub-series of packaging media exists before the sub-series is to be created. This order also comprises the number of packaging media (20). This number is entered (5) into the computer system (100), and the computer system (100) is then aware of how many pre-printed packaging media the resulting sub-series (22) should have. The ordered number (30) can be input in many different ways, e.g. in the cutter computer (300) by the cutting operator, or directly from a cutter machine responsible for the current order.

The sub-series (22) is then physically created (6) from the series (21). This usually involves counting the ordered number (30) of packaging media (20) from the first end (22a) and cutting or cutting the series (21) after the correct number has been counted. Counting may be manual or automatic.

In an embodiment the series (21) is initially wound on a roll and a cutting machine counts the ordered number (30), cuts the roll after the correct number of continuous packaging media (20) and winds the resulting sub-series (22) onto a new roll.

The last unique code (200n) marked on a last packaging media (20) in a last end (22b) of said sub-series (22), opposite said first end 22(a) is registered (7) in the computer system (100).

This can in one embodiment be done by the cutting operator that is scanning last first unique code (200b) that appears in a last end (22b) of the sub-series (22). In FIG. 1, a scanner can be seen connected to a cutter computer (300) in communication with the computer system (100). The cutter computer may in one embodiment be part of a larger cutter machine, but this is not important for the invention. What is essential is that the last unique code (200b) can be read and sent to the computer system (100).

The registering (4) of the first unique code (200a), creating (6) the sub-series and registering (7) of the last unique code (200b) may be performed in any order. In one embodiment the registering (4) of the first unique code (200a) is performed before cutting and reading the last unique code (200b). However, the last unique code may well be read before the final cut of the series. The invention is not dependent on the order of the registration of information in the computer system (100), however, what is essential, is that the information becomes available to the computer system (100). This means for instance that the first code (200a) can be recorded, and then the "de facto" ordered number (30) can be produced by a counting method or counting device on the slitting and winding machine, or other suitable machinery, then entered, and then the last code (200n) can be recorded.

Next the computer system (100) calculates (8) an expected number (31) of packaging media (20) in said sub-series (22) based on a difference between said first unique code (200a) and said last unique code (200n) in said sequence (150) of unique codes (200). This is the number of packaging media (20) the computer system (100) expects based on the number of unique codes (200) between the first unique code (200a) and the last unique code (200n) in said sequence (150). E.g. the sequence (150) may have 1000 unique codes (200). In the example in FIG. 1 it can be seen that the first and last unique codes (200a, 200n) of the first sub-series (22) has been sent to the computer system (200). The computer system looks into the sequence (150) and finds that there is one unique code (200) between the first and last unique codes (200a, 200n) of the sequence, and that the expected number (31) of packaging media (20) in the sub-series (21) therefore should be 3.

Further the computer system (100) accepts (9) said sub-series of packaging media (20) if a difference (32) between said expected number (31) and said ordered number (30) is within a pre-defined tolerance (33), or refuses (9) said continuous packaging media (20) if said difference (32) between said expected number (31) and said ordered number (30) is outside said pre-defined tolerance (33).

In the example in FIG. 1 the ordered number (30) was three, which is the same as the expected number (31), so the difference (32) is zero, which is within the predefined tolerance (33) of ±1. The computer system (100) can therefore verify that the sub-series is according to the order. In an embodiment the computer system (100) sends (10) the verification information to the cutter computer (300), or the operator, which then can release the sub-series (22) of pre-printed packaging media and send it to the intended manufacturing or packaging location.

The manufacturing process of pre-printed packaging media (20) often starts from large master strands or master rolls (25) that are later cut into thinner lanes or series (21). This is illustrated in the upper right part of FIG. 1. For the later verification process, it is therefore important that the unique codes (200) are marked on packaging media (20) of such a series (21) that will result in the same sequence as the sequence (150) of unique codes (200).

However, when a master roll (25) is used, the marking (2) may be performed row by row, i.e. perpendicular to the direction of the series (21). In this case the marking (2) step may in one embodiment select unique codes (200) from several sequences (150) generated by the computer system (100).

In another embodiment the computer system comprises a cut parameter that is set to the number of lanes or series (21) that the master roll (25) is going to be split into. The cut parameter can also be set during or after the actual marking (2). This way the computer system has registered that the resulting sequence (150) for a series (21) is constituted by e.g. every fourth or every fifth unique code in the sequence of generated codes (200).

Normally during manufacture of the sub-series, there is little or no possibility for detecting the direction of the sub-series, e.g. whether the first or last unique code (200a, 200n) ends up in the first end or the last end. Especially when master rolls are used initially, the final direction of the unique codes marked on the packaging material (20) may be unknown.

According to an embodiment of the invention, the computer system (100) therefore verifies a sub-series independent of the order of the sequence (150), as long as the absolute difference between the first and last unique codes (200a, 200n) fulfils the requirements above.

The direction is thus determined by analyzing the unique codes on two consecutive packaging media, with respect to the direction of the sequence (150), i.e. the direction is determined relative said sequence (150) of said sub-series (22) based on said first unique code (200a) and said next unique code (200b).

According to an embodiment of the invention the sub-series (22) are wound to a roll before registering said last unique code (200n).

The computer system (100) may act as a central information store for key parameters during the manufacture of the packaging media, as well as during packaging and later authentication. According to an embodiment of the invention an identifier of the sub-series (22) manufactured, is registered in a storage location of said computer system (100), and other information related to the sub-series may also be added later.

One such parameter of the sub-series is the direction of the sub-series, when it is wound on a roll, or stored in a box, or any other suitable arrangement for distributing the sub-series. In this embodiment the direction is registered in a storage location of said computer system (100). The storage location may be any location for storing information for the computer system (100), internally or externally, in e.g. a memory, database or file system.

The computer system (100) might also be configured to handle several different scanning modes, and make various calculations based on these. For instance, if the scanned packaging media has to be destructed in order to be able to scan, as is the case with tamper evident labels, then the active range will start after the last scanned label, both at the start as well as at the last labels.

If a scanner is used in the system, it may be any type of scanning device arranged for reading the unique codes (200) and transferring them to the computer system (100).

In an embodiment the first and last unique codes (200*a*, 200*n*) are registered in said computer system (100) by scanning said first and last unique codes (200*a*, 200*n*) with a scanner communicating with said computer system (100).

The unique code may also be entered manually in a terminal communicating with the computer system (100).

The sub-series of packaging material, whether on rolls, in boxes or any other format, that have been controlled and recorded by the computer system (100), are then transported to the intended location where they should be used in an intended packaging process.

Although, not part of the invention itself, the advantages of the invention can easily be understood by looking at a typical scenario where such sub-series are presented for the packaging process. As a first action, a unique code (200) may be scanned and looked up in the computer system (100). The computer (100) can then immediately respond with the number of packaging media in the sub-series, batch number etc. If the first packaging media is scanned, the computer system (100) can also give information about the winding direction of the sub-series etc.

What is claimed is:

1. A method for manufacturing a group of packaging media comprising the steps of:
   producing a series of packaging media;
   generating a sequence of unique codes in a computer system, wherein said unique codes are generated with a sequential order;
   physically marking the series of packaging media with said unique codes, wherein said sequential order is maintained in said series;
   physically creating two or more sub-series of packaging media from said series by:
      registering in said computer system, a first unique code marked on a first packaging media in a first end of said series;
      entering an ordered number of packaging media in said computer system;
      physically creating said sub-series of packaging media from said series of packaging media based on said ordered number, and physically arranging said sub-series of preprinted packaging media as group suitable for transporting;
      registering in said computer system, a last unique code marked on a last packaging media in a last end of said sub-series, opposite said first end;
      calculating in said computer system an expected number of packaging media in said sub-series based on a difference between said first unique code and said last unique code in said sequence of unique codes; and
      accepting said sub-series of packaging media if a difference between said expected number and said ordered number is within a pre-defined tolerance, or refusing said sub-series of continuous packaging media if said difference between said expected number and said ordered number is outside said pre-defined tolerance; and
   placing each of accepted sub-series of packing media with respective unique codes in a container for further transportation to an intended manufacturing or packaging location.

2. The method according to claim 1, further comprising the step of:
   accepting in said computer system said sub-series of packaging media only if said first unique code can be verified to have been generated by said computer system.

3. The method according to claim 1, further comprising the steps of:
   registering in said computer system a next first unique code marked on a packaging media subsequent said first packaging media; and
   accepting said sub-series of packaging media only if said next first unique code is subsequent said first unique code in said sequence of unique codes in said computer system.

4. The method according to claim 3, further comprising the step of:
   determining a direction relative said sequence of said sub-series based on said first unique code and said next unique code.

5. The method according to claim 1, wherein a sub-series identifier is registered in a storage location of said computer system.

6. The method according to claim 1, wherein said direction is registered in a storage location of said computer system.

7. The method according to claim 1, wherein said first and last unique codes are registered in said computer system by scanning said first and last unique codes with a scanner communicating with said computer system.

8. The method according to claim 2, further comprising the step of:
   registering a sub-series identifier in a storage location of said computer system.

9. The method according to claim 3, further comprising the step of:
   registering a sub-series identifier in a storage location of said computer system.

10. The method according to claim 4, further comprising the step of:
    registering a sub-series identifier in a storage location of said computer system.

11. The method according to claim 2, further comprising the step of:
    registering said direction in a storage location of said computer system.

12. The method according to claim 3, further comprising the step of:
    registering said direction in a storage location of said computer system.

13. The method according to claim 4, further comprising the step of:
    registering said direction in a storage location of said computer system.

14. The method according to claim 6, further comprising the step of:
    registering said direction in a storage location of said computer system.

15. The method according to claim 2, wherein said first and last unique codes are registered in said computer system by scanning said first and last unique codes with a scanner communicating with said computer system.

16. The method according to claim 3, wherein said first and last unique codes are registered in said computer system by scanning said first and last unique codes with a scanner communicating with said computer system.

17. The method according to claim 4, wherein said first and last unique codes are registered in said computer system by scanning said first and last unique codes with a scanner communicating with said computer system.

18. The method according to claim 6, wherein said first and last unique codes are registered in said computer system by scanning said first and last unique codes with a scanner communicating with said computer system.

\* \* \* \* \*